United States Patent [19]

Ejima et al.

[11] Patent Number: 5,485,551

[45] Date of Patent: Jan. 16, 1996

[54] FUZZY INFERENCE DEVICE

[75] Inventors: Hideji Ejima, Kyoto; Taiji Yoshikawa, Nagaokakyo, both of Japan

[73] Assignee: Omron Corporation, Kyoto, Japan

[21] Appl. No.: 736,635

[22] Filed: Jul. 26, 1991

[30] Foreign Application Priority Data

Jul. 26, 1990 [JP] Japan .................. 2-196260
Jul. 26, 1990 [JP] Japan .................. 2-196261

[51] Int. Cl.$^6$ .................................. G05B 13/00
[52] U.S. Cl. .................. 395/61; 395/76; 395/900
[58] Field of Search ............. 395/900, 61, 76, 395/51

[56] References Cited

U.S. PATENT DOCUMENTS

| | | | |
|---|---|---|---|
| 4,860,214 | 8/1989 | Matsuda et al. | 395/61 |
| 4,868,763 | 9/1989 | Masui et al. | 364/513 |
| 5,189,728 | 2/1993 | Yamakawa et al. | 395/51 |
| 5,253,332 | 10/1993 | Kumamoto | 395/51 |

FOREIGN PATENT DOCUMENTS

| | | | |
|---|---|---|---|
| 318985 | 6/1989 | European Pat. Off. | G06F 9/44 |
| 337423 | 10/1989 | European Pat. Off. | G05B 13/02 |
| 378689 | 7/1990 | European Pat. Off. | G05B 13/00 |
| 02273802 | 11/1990 | Japan | G05B 13/02 |
| 02272638 | 11/1990 | Japan | G06F 9/44 |
| 02294832 | 12/1990 | Japan | G06F 9/44 |
| 03025532 | 2/1991 | Japan | G60F 9/44 |
| 03071303 | 3/1991 | Japan | G05B 13/02 |

OTHER PUBLICATIONS

Chiu et al, "A Fuzzy Logic Programming Environment for Real–Time Control," International Journal of Approximate Reasoning, 1988; 2: 163–175.

Giles, "The Concept of Grade of Membership," Fuzzy Sets and Systems 25 (1988), 297–323, North Holland.

Lee, "Fuzzy Logic in Control Systems: Fuzzy Logic Controller—Part I", IEEE Transactions on Systems, Man, and Cybernetics, vol. 20 No. 2 Mar./Apr. 1990 pp. 404–418.

Lee, "Fuzzy Logic in Control Systems: Fuzzy Logic Controller—Part II", IEEE Transactions on Systems, Man, and Cybernetics, vol. 20, No. 2, Mar./Apr. 1990, pp. 419–435.

Kaneko et al., "Expert System for Investment based on Fuzzy Reasoning" Jour. Info. Processing Society of Japan, Aug. 1989, 963–969.

Hirota, K., "Ambiguity Based on the Concept of Subjective Entropy," Fuzzy Info. and Decision Processes, 1982, 29–40.

Xie et al., "An Information Measure for Fuzzy Sets," IEEE Trans. on Syst., Man, and Cybernetics, Jan./Feb. 1984, 151–156.

Kosko, B., "Fuzzy Entropy and Conditioning," Info. Sciences, 1986, 165–174.

(List continued on next page.)

Primary Examiner—Robert W. Downs
Attorney, Agent, or Firm—Dickstein, Shapiro & Morin

[57] ABSTRACT

The knowledge of an expert user expressing the relationships between phenomena and a conclusion (a rule) is stored prior to the use of the device. Input data are applied to this knowledge in order to make an inference. The possibility of the conclusion is calculated, and the clearness of each phenomenon relative to the possibility of each conclusion is determined by the fuzzy inference device. The phenomena related to a single conclusion which have low static information amount or clearness are selectively eliminated. In this way the rule can be adjusted, the processing time can be reduced, and the reliability of the conclusion can be improved. In second and third embodiments of the invention, the knowledge of an expert user expressing the relationships between phenomena and conclusions (rules) is stored prior to the use of the device. Inferences are made by applying input data to this knowledge. The possibilities of conclusions are calculated; the clearness of each phenomenon relative to the calculated possibility of each conclusion is determined; and the summed clearness of each conclusion is calculated by the fuzzy inference device. Guidance is provided to select which phenomena to input in order to maximize the sum of the clearnesses. The phenomena data selected by this guidance system can be input by a human or by an automatic means.

29 Claims, 13 Drawing Sheets

OTHER PUBLICATIONS

King, et al., "Multi-level Expert Control of a Large-Scale Industrial Process," Fuzzy Computing, 1988, 323–340.

Cheng et al., "Fuzzy Approach to Solve the Recognition Problem of Handwritten Chinese Characters," Pattern Recognition, 1989, 133–141.

Zadeh, L. A., "Outline of a New Approach to the Analysis of Complex Systems and Decision Processes," IEEE Trans. on Syst., Man, and Cybernetics, Jan. 1973, 28–44.

Mamdani, E. H., "Application of fuzzy algorithms for control of simple dynamic plant," Proc. IEE, Dec. 1974, 1585–88.

Czogala, E., et al., "On Energy–type of fuzziness measure and its application," Archiwum Automatyki i Telemechanika, 1981, 465–475.

De Luca, et al., "On Some Algebraic Aspects of the Measures of Fuzziness," Fuzzy Info. and Decision Processes, 1982, 17–24.

| CONCLUSION / RANKING | c1 | c2 | c3 | ...... | cn |
|---|---|---|---|---|---|
| 1 | If$3_S$ | If$2_S$ | If$1_S$ | ...... | If$2_S$ |
| 2 | If$1_S$ | If$8_S$ | If$2_S$ | ...... | If$5_S$ |
| 3 | If$4_S$ | If$4_S$ | If$6_S$ | ...... | |
| ⋮ | ⋮ | ⋮ | ⋮ | ⋮ | ⋮ |
| m | | If$6_S$ | | ...... | |

FIG. 6

| CONCLUSION / PHENOMENON | c1 | c2 | c3 | ......... | cn |
|---|---|---|---|---|---|
| f1 | CL 11 | CL 12 | CL 13 | ......... | CL 140 |
| f2 | CL 21 | CL 22 | CL 23 | ......... | CL 240 |
| f3 | CL 31 | CL 32 | CL 33 | ......... | CL 340 |
| ⋮ | ⋮ | ⋮ | ⋮ | CL ij | ⋮ |
| fm | CL m1 | CL m2 | CL m3 | ......... | CL mn |
| TOTAL | 1 | 1 | 1 | ......... | 1 |

FIG. 12

| CONCLUSION / PHENOMENON | c1 | c2 | c3 | ......... | cn |
|---|---|---|---|---|---|
| f1 | 1 | 0 | 1 | ......... | 1 |
| f2 | 1 | 1 | 0 | ......... | 0 |
| f3 | 0 | 0 | 0 | ......... | 0 |
| ⋮ | ⋮ | ⋮ | ⋮ | ✗ | ⋮ |
| fm | 1 | 0 | 0 | ......... | 1 |

FIG. 13

| CONCLUSION | POSSIBILITY | SUMMED |
|:---:|:---:|:---:|
| c1 | 0.9997 | 0.5000 |
| c5 | 0.8776 | 0.7800 |
| c30 | 0.7765 | 0.1200 |
| c35 | 0.5600 | 0.8000 |
| c20 | 0.1200 | 1.0000 |
| c6 | 0.0003 | 1.0000 |
| ⋮ | ⋮ | ⋮ |

FUZZY INFERENCE DEVICE

BACKGROUND OF THE INVENTION

Field of the Invention

This invention relates to fuzzy logic devices which use expert knowledge defined by rules to draw conclusions from input phenomena. More particularly, it relates to apparatus for refining the fuzzy inference rules by: (1) eliminating therefrom the effect of expert knowledge which has little effect on the conclusion, and (2) insuring that knowledge which has greater input on the conclusions is included in the rules.

Fuzzy inference is well known as a method by which the information amount of a phenomenon, which was used to arrive at an inference, can be used to correct or change the conclusion arrived at by inference. (See, for example, Zhang Hongmin, "An Expert System with Thinking in Images," *Preprints of the Second IFSA Congress, Tokyo, Jul. 20–25, 1987*, p. 765.)

The Fuzzy inference method is used to increase the discriminatory capacity of inference making. For each phenomenon, the information amount of a phenomenon (i.e., the capacity the phenomenon possesses for the discrimination of its information) is determined using a membership function corresponding to each conclusion which may be drawn for that phenomenon. The inference (i.e., the possibility that a conclusion can be drawn) is corrected or changed (by finding the product of the possibility and the information amount) using the information amount of the phenomenon which led to that conclusion. As a result, the discriminability of various inference results can be maximized.

However, in previous fuzzy inference devices, phenomena that could be used to draw a conclusion were lumped together by rules with phenomena which could not be used. Thus, an actual fuzzy inference required voluminous input data, which translated into considerable processing time. This was a serious shortcoming for applications such as diagnostic checks, which require an accurate conclusion in a short time.

Moreover, in existing fuzzy inference schemes the possibility of each conclusion is calculated based on the phenomenon data which have been input, and if not all the data have been input for the phenomena, the possibilities and concomitantly the clearnesses will have very low values. This makes it impossible for a person to evaluate a conclusion accurately.

If all the phenomena data are input, the clearnesses assume high values. However, for applications like diagnostic checks, in which speed is essential, inputting all the data would be too time-consuming.

An experienced specialist can, to an extent, selectively input only the efficient phenomena data. Should an inexperienced novice, however, try inputting an incomplete set of phenomena data, he will not be able to produce high clearness values.

SUMMARY OF THE INVENTION

In view of the foregoing shortcomings this invention provides for a fuzzy inference device in a first embodiment which can adjust the inference rules (i.e. knowledge expressing the relationship between phenomena and a conclusion) by excluding useless knowledge from them. In a second embodiment of the invention, a user is able to input efficiently those phenomena data which have the greatest effect on the conclusion and the fuzzy inference device is able to achieve a conclusion with high clearness (high reliability) based on the smallest possible number of phenomena data.

Therefore, one object of the present invention to provide a fuzzy inference device that is equipped with a means to input the fact that specified phenomena must be eliminated to arrive at a conclusion shown on the aforesaid display.

Another object of the invention is to provide a fuzzy inference device that recalculates the possibility of a conclusion based on the relationship between phenomena and that conclusion after the specified phenomena are eliminated from a relationship.

Another object of the invention is to provide a fuzzy inference device which recalculates the static information amount and the clearness using the relationship between phenomena and a conclusion after the specified phenomena are eliminated from that relationship.

Another object of the invention is to provide a fuzzy inference that displays the static information amount and clearness of each of a number of phenomena with respect to a single conclusion on a display. When a user sees these values, he can input, via an elimination device, information that the phenomena with low static information amount and clearness, i.e., the phenomena which are not useful, should be eliminated. In this way, the knowledge (or rule) expressing the relationship between phenomena and a conclusion can be adjusted, and a more concise and significant relationship can be achieved.

Another object of the invention is to provide a fuzzy inference device with a means to direct that phenomenon data be input in an order determined by the ranking of the static information amounts of all the phenomena calculated by the calculation device. Thus, a user can input the phenomenon data according to the direction provided.

Another object of the invention is to provide a fuzzy inference device having a means to input the phenomenon data in an order determined by the ranking of the static information amounts of all the phenomena calculated by the calculation device. Thus, the phenomenon data can be input without requiring any work on the part of a person.

Another object of the invention is to provide a fuzzy inference device that is equipped with a means to calculate clearness which determines the clearness of each phenomenon with respect to each conclusion using static information amount obtained from the calculation device. Using the clearnesses thus calculated, the device sums the clearnesses of the phenomena for which data have actually been input and calculates the clearness of each conclusion. This allows a user to evaluate the clearness of each conclusion.

Another object of the invention is to provide a fuzzy inference device that is equipped with a means to control the processing in such a way that phenomena data are input and clearnesses calculated repeatedly until the value of the clearnesses summed by a calculation device reaches a specified value for at least one conclusion. In this, way the clearness of a conclusion can be calculated with high reliability.

Another object of the invention is to provide a fuzzy inference device that is equipped with a means to perform fuzzy inferences which calculates the possibilities of conclusions by applying input data for each phenomenon to the stored relationships. The means used to perform fuzzy inferences is ideally composed of a means to calculate a grade which can optimize the grade using a membership function which expresses the input data in terms of the stored relationship; a means to calculate dynamic information amount which determines the dynamic information amount of each phenomenon using this grade; and a means to calculate a possibility which determines the possibility of a conclusion using the grade and dynamic information amount.

Another object of the invention is to provide a fuzzy inference device which outputs the static information amounts of all the phenomena in descending order of size. This enables a user to input phenomena data for each phenomenon in an order determined by the ranking of their static information amounts. The static information amount of a phenomenon serves as an index of how clearly a conclusion can be discriminated by the membership function of that phenomenon. If phenomena data are input in descending order of the static information amounts of the phenomena, a conclusion with high clearness can be achieved with the input of a relatively small number of phenomena data. A fuzzy inference can be performed with greater efficiency, and processing time can be decreased. A novice who is unable to judge which phenomena data should be input first, or for whom such judgments are difficult, is instructed as to the order of phenomena data. This allows him to reach a conclusion without undue hesitation and with great efficiency.

Another object of this invention is to provide a fuzzy inference device having a means to display, in descending order of size, the clearness obtained for each phenomenon relative to each conclusion.

Another object of the invention is to provide a fuzzy inference device which is equipped with a means to sum the clearnesses of the phenomena for which data have actually been input in order to calculate the clearness of each conclusion. The device is also equipped with a means to control the processing in such a way that phenomena data are input and clearnesses calculated repeatedly until the value of the clearnesses summed by a calculation device reaches a specified value for at least one conclusion.

Another object of the invention is to provide a fuzzy inference device that presents the clearness of each phenomenon relative to each conclusion in descending order of size. This allows phenomena data to be input in corresponding order. Further, it allows a conclusion with high clearness to be attained efficiently in a short time with a small number of input data. It also allows an inexperienced user to operate the device in a simple and efficient manner.

Another object of the invention is to provide a fuzzy inference device with means to select those phenomena which cause the sum of the clearnesses to attain its maximum possible value with respect to a given conclusion.

As described above, the fuzzy inference device of this invention allows phenomena to be selected which increase the maximum value of the summed clearnesses. By inputting the data for these selected phenomena, one can be assured in an early stage of the processing that the summed clearnesses are sufficient to evaluate the conclusion. Consequently, one need not input all the phenomenon data. The end result is that a conclusion can be achieved quickly and efficiently.

There are a number of circumstances in which it is helpful to use the aforesaid selection device: when only a small number of phenomenon data have been input, and the user considers it difficult or dangerous to evaluate the conclusion; when there are several conclusions with high possibilities; when the user feels that phenomenon data which he considers to be essential have not yet been input; and other such cases.

By using phenomenon selection, one insures that those phenomenon data can be input which will function most effectively. This feature allows a user who is not an expert to produce a conclusion efficiently. It is particularly useful for the novice, as it indicates to him one by one which phenomena he should input data for. This enables even a beginning user to be proficient at inputting data.

It sometimes happens that the knowledge codified at the time the system is designed is not appropriate. In this case, the value of the summed clearnesses will remain low unless a large number of phenomenon data are entered. This invention allows the user to evaluate the catalogued knowledge in the design stage, thereby supporting the most favorable design.

Briefly, the fuzzy inference device designed according to this invention includes a means to store, prior to the use of the device, information about the relationship between phenomena and a conclusion; a means to perform fuzzy inferences which calculates the possibility of a conclusion by applying the relationship stored in the aforesaid device to input data; a means to calculate the static information amount and the clearness of each phenomenon with respect to each conclusion using the relationship stored in the aforesaid device; and a means to display the static information amount or clearness calculated by the aforesaid device for a particular conclusion.

The fuzzy inference device designed according to a second embodiment of this invention includes a means to store, prior to the use of the device, the relationships between phenomena and conclusions; a means to calculate the static information amount of each phenomenon using the relationships stored in the aforesaid device; and a means to output the static information amounts calculated by the aforesaid device in relation to each phenomenon in order of descending size.

As demonstrated above, the device of this invention enables the user to evaluate the usefulness of each phenomenon with respect to the relationship (or rule) between phenomena and a conclusion which has been established (or specified). It thus enables the device to be used to appraise the value of phenomena. Because useless phenomena are eliminated, the relationship between phenomena and a conclusion becomes more concise and significant. Fewer input data for phenomena are required to produce a useful fuzzy inference, and processing time is reduced. If many of the phenomena used have low static information amount and clearness, the possibility which is obtained for a conclusion will be inaccurate. This invention allows such phenomena to be eliminated from the relationship, with the result that the possibility can be calculated with a high reliability for the ultimate conclusion.

With these and other objects, advantages and features of the invention may be further understood by reference to the following detailed description of the invention, the appended claims and to the several drawings attached herein.

BRIEF DESCRIPTION OF THE DRAWINGS

FIG. 6 is a table of static information amounts;

FIG. 12 is a table of the clearnesses of all the phenomena with respect to each conclusion;

FIG. 13 is a table showing input completed flags;

FIG. 14 is a table showing the possibility and summed clearnesses for each conclusion.

DETAILED DESCRIPTION OF THE PREFERRED EMBODIMENTS

Figure 1:
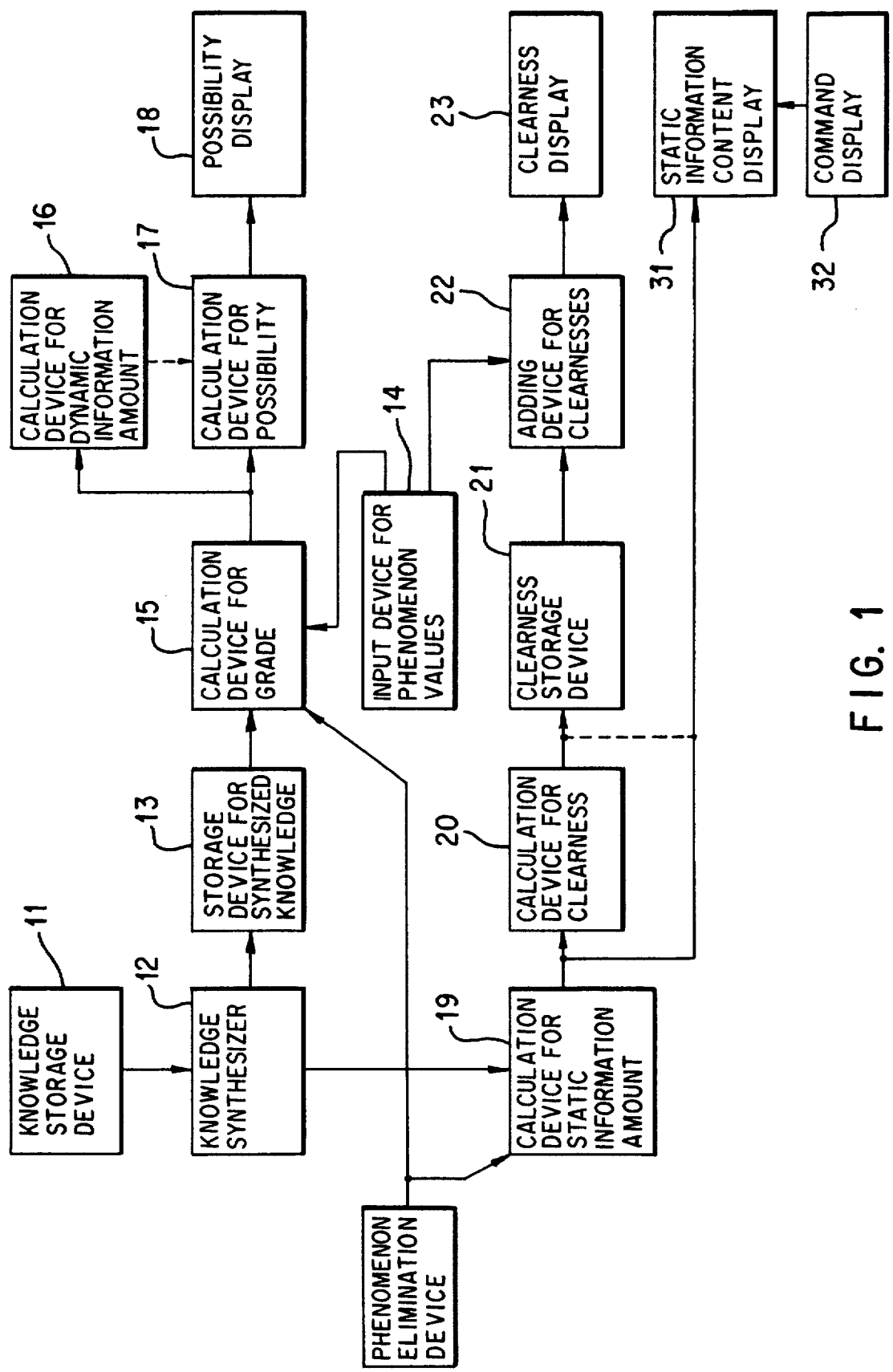
FIG. 1 is a block diagram showing the configuration of an exemplary fuzzy inference device constructed according to a first embodiment of the invention.

Referring now in detail to the drawings wherein like parts are designed by like reference numerals, an example of the entire structure of a fuzzy inference device according to a first embodiment of the invention is shown in FIG. 1.

Briefly, this device consists of a knowledge storage device 11, a knowledge synthesizer 12, a storage device 13 for synthesized knowledge, an input device 14 for entering values of phenomena, a calculation device 15 to determine a grade, a calculation device 16 to determine a dynamic information amount, a calculation device 17 to determine a possibility, a possibility display device 18, a calculation device 19 to determine static information amount, a calculation device 20 to determine clearness, a clearness storage device 21, an adding device 22 to add clearnesses, a clearness display device 23, a display device 31 for displaying static information amount, a command display device 32, and an elimination device 33 to remove useless phenomena. The knowledge storage device 11 stores knowledge input by an expert user or a similar specialist. This knowledge is stored in a form which expresses the relationship between phenomena and a conclusion. The device can store the knowledge of more than one expert. As an example, the knowledge contributed by two experts, who shall be called ex1 and ex2, and stored in device 11, is expressed below in the form of rules:

Expert ex1:

$$\text{If } 20 \leq f1 \leq 60, 0 \leq f2 \leq 40, \ldots, a_{i1} \leq f1 \leq b_{i1}, \text{ and} \ldots \text{ then c1} \quad (1)$$

$$\text{If } 40 \leq f1 \leq 80, 60 \leq f2 \leq 100, \ldots, a_{i2} \leq f1 \leq b_{i2}, \text{ and} \ldots \text{ then c2} \quad (2)$$

$$\text{If} \ldots, a_{ij} \leq f1 \leq b_{ij}, \text{ and} \ldots \text{ then cj} \quad (3)$$

Expert ex2:

$$\text{If } 30 \leq f1 \leq 50, 10 \leq f2 \leq 30, \ldots, a_{i1} f1 \leq b_{i1}, \text{ and} \ldots \text{ then c1} \quad (4)$$

$$\text{If } 50 \leq f1 \leq 70, 70 \leq f2 \leq 90, \ldots, a_{i2} \leq f1 \leq b_{i2}, \text{ and} \ldots \text{ then c2} \quad (5)$$

$$\text{If} \ldots, a_{ij} \leq f1 \leq b_{ij}, \text{ and} \ldots \text{ then cj} \quad (6)$$

where f1, f2 and fi are phenomena which are called, respectively, phenomenon 1, phenomenon 2 and phenomenon i. The value i represents a value in the range between 1 and m; c1, c2 and cj are conclusions which are defined, respectively, as conclusion 1, conclusion 2 and conclusion j. The symbol j represents a value in the range between 1 and n. $a_{ij}$ and $b_{ij}$ expressed in the phrase $a_{ij} \leq f1 \leq b_{ij}$ are called, respectively, the minimum value and the maximum value.

When the rules given above are expressed in the form of a table for each expert, they appear as follows.

TABLE 1

| | Expert ex1 | | | | |
|---|---|---|---|---|---|
| | Conclusion | | | | |
| | c1 | | c2 | | ... |
| Phenomenon | Minimum Value | Maximum Value | Minimum Value | Maximum Value | ... |
| f1 | 20 | 60 | 40 | 80 | ... |
| f2 | 0 | 40 | 60 | 100 | ... |

TABLE 2

| | Expert ex2 | | | | |
|---|---|---|---|---|---|
| | Conclusion | | | | |
| | c1 | | c2 | | ... |
| Phenomenon | Minimum Value | Maximum Value | Minimum Value | Maximum Value | ... |
| f1 | 30 | 50 | 50 | 70 | ... |
| f2 | 10 | 30 | 70 | 90 | ... |

The knowledge synthesizer 12 synthesizes the knowledge of two or more experts stored in storage device 11 and gives it a coherent form.

Various methods can be used to synthesize expert knowledge. For example, the mean and standard deviation are calculated for the maximum and minimum values supplied by the various experts for each phenomenon relating to each conclusion. The processing involved in synthesizing the knowledge can be explained using, as an example, the above-described knowledge of two experts, which leads from phenomenon f1 to conclusion c1.

Once it is determined, from the rules 1–4, the rule which allows one to draw conclusion c1 from phenomenon f1, the knowledge synthesis is expressed as follows:

$$\text{Expert ex1: If } 20 \leq f1 \leq 60 \text{ then c1} \quad (7)$$

$$\text{Expert ex2: If } 30 \leq f1 \leq 50 \text{ then c1} \quad (8)$$

The mean of the minimum values $m_{min}$ and the mean of the maximum values $m_{max}$ are the calculated, as follows:

$$m_{min} = \frac{20 + 30}{2} = 25 \quad (9)$$

$$m_{max} = \frac{60 + 50}{2} = 55 \quad (10)$$

The standard deviation of the minimum mmin and the mean of the maximum values mmax are then calculated, as follows:

$$\sigma_{min} = \left( \frac{20^2 + 30^2}{2} - m_{min}^2 \right)^{1/2} = 5 \quad (11)$$

$$\sigma_{max} = \left( \frac{60^2 + 50^2}{2} - m_{max}^2 \right)^{1/2} = 5 \quad (12)$$

By these formulas the knowledge of the various experts is synthesized for every minimum and maximum value of each phenomenon associated with each conclusion as it appeared in the aforesaid rules 1–6. This synthesized knowledge is expressed in the following Table 3:

TABLE 3

| Phenom-enon | Conclusion | | | | | | | | |
|---|---|---|---|---|---|---|---|---|---|
| | c1 | | | | c2 | | | | ... |
| | Minimum Value | | Maximum Value | | Minimum Value | | Maximum Value | | ... |
| | Mean | Standard Deviation | Mean | Standard Deviation | Mean | Standard Deviation | Mean | Standard Deviation | ... |
| f1 | 25 | 5 | 55 | 5 | 45 | 5 | 75 | 5 | ... |
| f2 | 5 | 5 | 35 | 5 | 65 | 5 | 95 | 5 | ... |
| ... | ... | ... | ... | ... | ... | ... | ... | ... | |

As one example of a membership function, a scheme which creates membership functions by means of a Gaussian distribution using the expert knowledge which has been synthesized as described above is discussed.

Using the mean of the minimum values $m_{min}$, the mean of the maximum values $m_{max}$, the standard deviation of the minimum values $\sigma_{min}$ and the standard deviation of the maximum values $\sigma_{max}$, the membership function can be expressed by the following formula:

$$\Phi(x) = \text{Gauss}\left( \frac{x - m_{min}}{\sigma_{min}} \right) - \text{Gauss}\left( \frac{x - m_{max}}{\sigma_{max}} \right) \quad (13)$$

where:

x: Input data value associated with a phenomenon $\Phi(x)$: Degree to which an input data value x conforms to a phenomenon (grade)

Gauss (x): Value of the Gaussian distribution of input data value x

Figure 2:
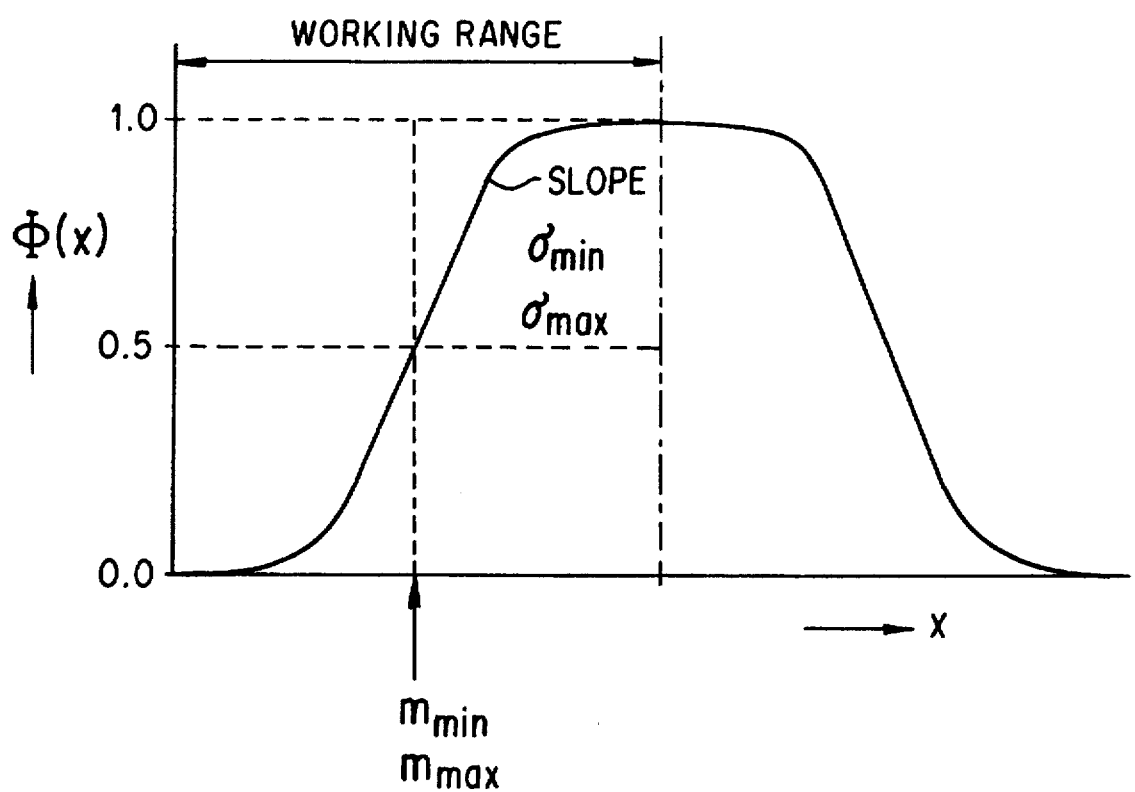
FIG. 2 is a graph illustrating a Gaussian distribution.

FIG. 2 illustrates an example of a Gaussian distribution. To create a membership function in this Gaussian distribution curve, where only the left half is used, the position of x in $\Phi(x)=0.5$ is determined by $m_{min}$ or $m_{max}$, and the slope by $\sigma_{min}$ or $\sigma_{max}$.

Let us use, as an example, the membership function by which phenomenon f1 is associated with conclusion c1. The values obtained from Formulas (9) through (12) are used to create the graphs in FIGS. 3A through 3C. In this case, Formula (13) is as follows:

$$\phi(x) = \text{Gauss}\left( \frac{x - 25}{5} \right) - \text{Gauss}\left( \frac{x - 55}{5} \right) \quad (14)$$

Figure 3A:
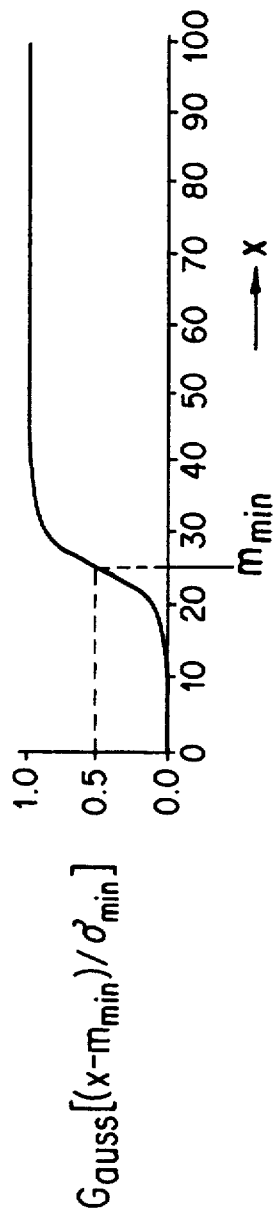
FIGS. 3A, 3B and 3C are graphs of selected membership functions.
Figure 3B:
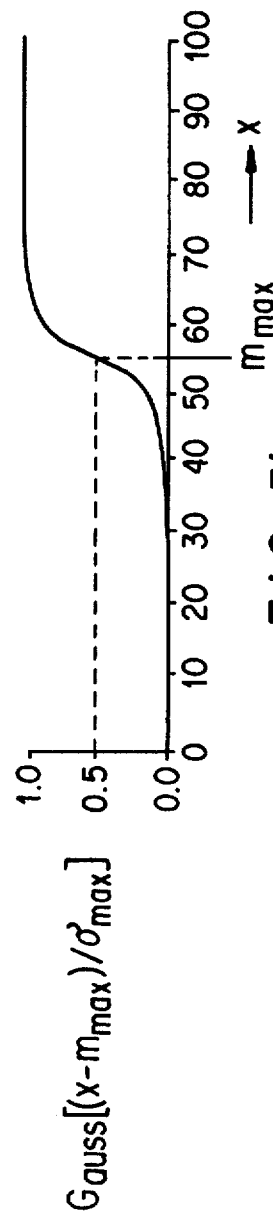
Figure 3C:
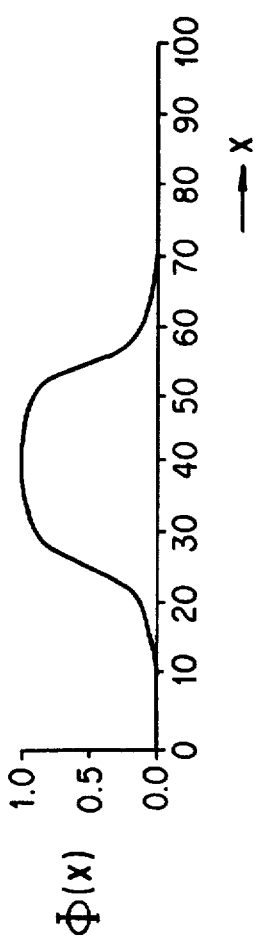

FIG. 3A shows the first term on the right side of formulas (13) and (14); FIG. 3B shows the second term on the right side of formulas (13) and (14); and FIG. 3C shows the result of subtracting the second term from the first term. In other words, FIG. 3C shows the membership function expressed by formula (13) or formula (14).

Figure 4A:
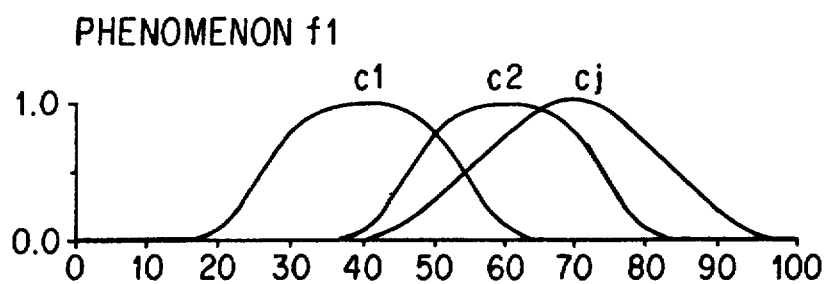
FIGS. 4B, 4B and 4C are graphs of membership functions obtained for each of a plurality of the phenomena.
Figure 4B:
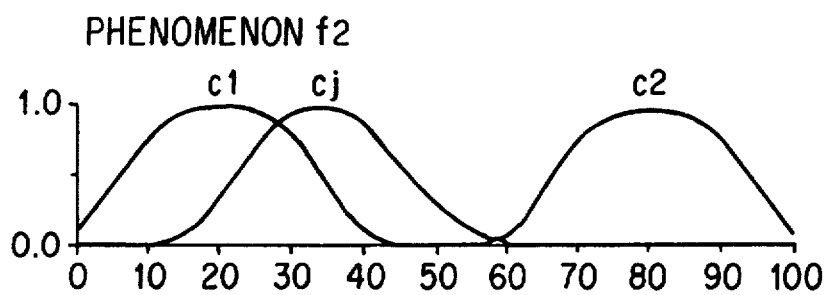

Examples of the membership functions obtained for conclusions c1, c2 and cj by using the synthesized phenomenon data for phenomena f1, f2 and fi are shown in FIGS. 4A, B and C.

Referring back to FIG. 1, the mean values and standard deviation values calculated by the knowledge synthesizer 12 are stored in the storage device 13 in the form shown in Table 3, as described previously.

As it is unnecessary to resynthesize the knowledge each time a new inference is to be made, the synthesized data can be stored in advance in this form. Further, the values stored in device 13 can be read out and used to make each inference, thus increasing the speed at which inferences can be processed.

The phenomena value input device 14 consists primarily of a keyboard, a communications interface, a memory and files. This device 14 reads the entered data input for each phenomenon. The data are then transmitted to the grade calculation device 15. In addition, data indicating whether or not the data for a given phenomenon have been input are sent to the clearness addition device 22. Data for phenomena need not be limited to definite values, but can also be sent in the form of linguistic data or membership functions.

The calculation device 15 calculates the grade with respect to each membership function (or conclusion) for the data input by the input device 14. In concrete terms, when the input data are in the form of definite values, the grade is obtained as $\Phi(x)$ by substituting the input data value for the variable x on the right side of formula (13). Of course, this formula is not the only way to calculate a grade. If the input data are in the form of linguistic values or membership functions, grade can be obtained by performing a MIN-MAX calculation.

The calculation devices 16 and 19 are described below. The input value associated with phenomenon f1 is defined as x1, that associated with phenomenon f2 as x2, and that associated with phenomenon fi as xi. These data are input by phenomenon value input device 14.

Figure 5A:
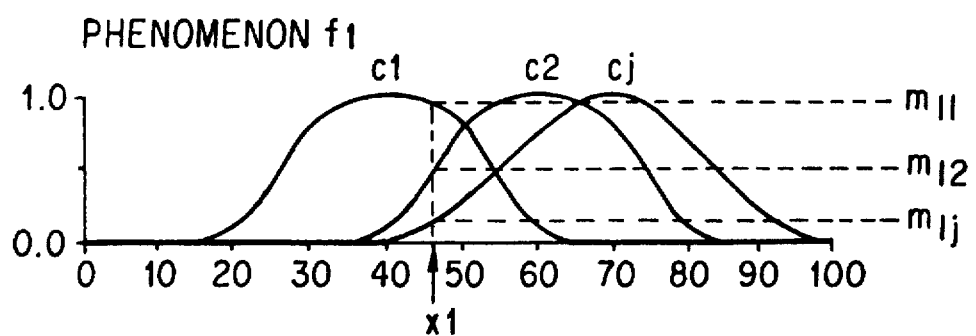
FIGS. 5A, 5B and 5C are graphs showing the degree of grade.
Figure 5B:
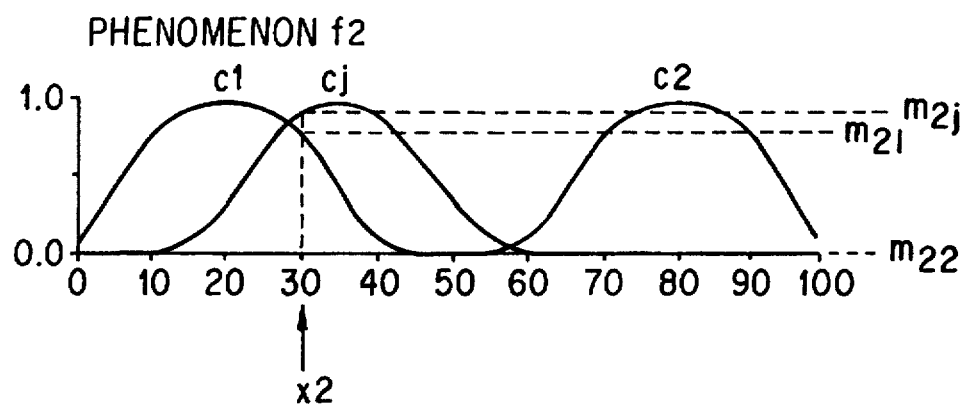
Figure 5C:
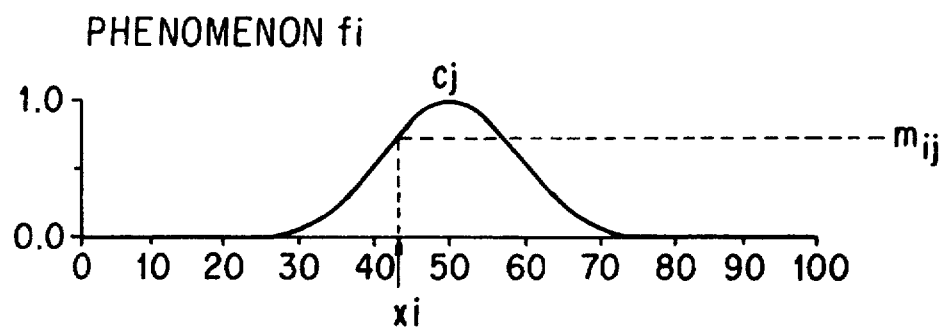

As shown in FIGS. 5A and 5B, the various goodnesses of fit values $m_{11}$, $m_{12}$, $m_{1j}$, $m_{21}$, $m_{22}$ and $m_{2j}$ are determined in the following way:

$m_{11}$: The grade of input data x1 with respect to conclusion c1

$m_{12}$: The grade of input data x1 with respect to conclusion c2

$m_{1j}$: The grade of input data x1 with respect to conclusion cj $m_{21}$: The grade of input data x2 with respect to conclusion c1

$m_{22}$: The grade of input data x2 with respect to conclusion c2

$m_{2j}$: The grade of input data x2 with respect to conclusion cj

Generally, $m_{ij}$ expresses the grade of input data (phenomenon value) xi with respect to the membership function for conclusion cj.

These goodnesses of fit values are calculated by the calculation device 15 when input data x1, x2 and xi are received.

An explanation of fuzzy entropy is necessary to understand the operation of devices 16 and 19. The fuzzy entropy Ef1 which is obtained at the time input value x1 is accepted, is defined as follows:

$$Efi = \sum_{j=1}^{n} \{(m_{ij}/M_i)\log(m_{ij}/M_i)\} \quad (15)$$

where $$M_i = \sum_{j=1}^{n} m_{ij} \quad (16)$$

Briefly, fuzzy entropy is a type of index of the discriminability of information. When input data xi is accepted, the value of fuzzy entropy will be small if a conclusion can be clearly discriminated from the input value, and large if a conclusion only be vaguely discriminated.

The range of values in which a fuzzy entropy Ef value can fall into is shown below:

$$0 \leq Ef \leq \log(n)$$

where:

n: number of conclusions for each phenomenon

The fuzzy entropy Efi is used to obtain dynamic information amount $Ifi_D(Xi)$ at the time input data xi is accepted. The value $Ifi_D(Xi)$, which shall be called the dynamic information amount, is the discriminatory power the phenomenon possesses with regard to deciding on a single conclusion when making an inference. The dynamic information amount $Ifi_D(Xi)$ of phenomenon fi is defined as the value achieved by subtracting the fuzzy entropy value Efi at the time input data xi is accepted from the maximum fuzzy entropy and follows the equation:

$$Ifi_D(xi) = \log(n) + \sum_{j=1}^{n} \{(m_{ij}/M_i)\log(m_{ij}/M_i)\} \quad (17)$$

The dynamic information amount of phenomenon fi will be zero if input data xi have not been received.

The calculation device 16 determines the dynamic information amount of each phenomenon according to formula (17), using the grades obtained by the calculation device 15.

As demonstrated above, the dynamic information amount is dependent upon input data xi. By contrast, the static information amount is independent of input data. The mean of the fuzzy entropies, that is, the value in the middle of the range of a phenomena, is subtracted from the maximum fuzzy entropy, and the resulting value is considered the static information amount of the phenomenon as a whole. As an example, the static information amount of phenomenon 1 is obtained by the following formula:

$$Ifi_s = \log(m) +$$

$$(1/p)\left[\sum_{k=1}^{p}\left\{\sum_{j=1}^{n}(m_{ij}(xi_k)/M_i(xi_k)) \times \log(m_{ij}(xi_k)/M_i(xi_k))\right\}\right] \quad (18)$$

where $$M_i(xi_k) = \sum_{j=1}^{n} m_{ij}(xi_k) \quad (19)$$

and where $m_{ij}(xi_k)$ is the grade of input data $xi_k$ associated with phenomenon fi with respect to the membership function for conclusion cj.

Figure 4C:
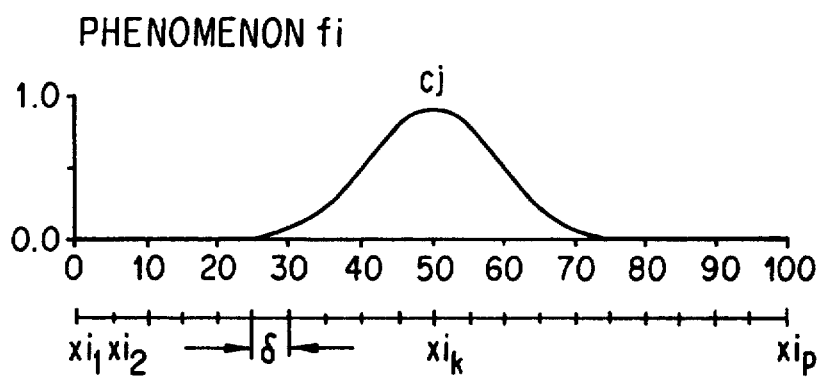

When the static information amount is obtained, the range of phenomenon f1 from $xi_1$ to $xi_p$ is divided into (p−1) segments at intervals of σ (See FIG. 4c). The term $(1/p)[\Sigma \ldots]$ in Formula (18) expresses the calculation for determining the fuzzy entropy for each $xi_k$ and finding the mean of these fuzzy entropies.

As can be deduced from formulas (18) and (19), the static information amount of a phenomenon is small when the overlap between the membership functions for the phenomenon is large, and large when the overlap is small. In other words, the static information amount indicates the degree to which a membership function for a phenomenon has a discriminable conclusion.

The calculation device 19 thereby calculates the static information amount of each phenomenon according to the aforementioned formulas (18) and (19), using the membership functions obtained by means of the synthesized knowledge. Because the static information amount is not dependent on input data, it need only be calculated once.

The operation of the calculation device 17 will now be described. For each conclusion, the sum of the information amounts of phenomena associated with that conclusion will be 1. The information amount is calculated in such a way that the relative strengths of information do not vary. The information amounts which are obtained are known as weights.

By way of example, for the aforementioned dynamic information amount, the weight wi of each phenomenon fi will be as follows:

$$wi = Ifi_D(xi)/\sum_{i=1}^{m} Ifi_D(xi) \quad (20)$$

The products of these weights and the goodnesses of fit are then calculated. The products are totaled for each conclusion cj, and the value obtained is the possibility $Pr_j$ of that conclusion.

In the example given above, $$Pr_j = \sum_{i=1}^{m}(wi \times m_{ij}) \quad (21)$$

The calculation device 17 calculates the possibility of each conclusion by performing the operations described above.

The possibility display 18 displays the possibility which has been calculated for each conclusion by the possibility calculation device 17. The display can be arranged so that it displays the possibilities for all the conclusions simultaneously, or in such a way that it displays the highest possibilities one or several at a time. Possibilities can be sent via a communications device to other equipment, and they can be stored in a memory or file.

The calculation device 20 calculates the clearness of each phenomenon with respect to each conclusion. This concept, the clearness of a phenomenon with respect to a conclusion, refers to a value which indicates the relative discriminability of each phenomenon at the time when the possibility of a certain conclusion is assessed. Thus clearness allows a comparison of the discriminability of several phenomena in order to settle on a certain conclusion. Clearness indicates which phenomenon has high discriminability (high information amount).

The clearness of each phenomenon with respect to each conclusion is obtained by the following formula.

$$Cl_{ij} = Ifi_s / \sum_{i=1(A_{ij} \neq 0)}^{m} Ifi_s \quad (22)$$

where $$A_{ij} = \sum_{k=1}^{p} m_{ij}(xi_k) \quad (23)$$

where if there exists for phenomenon fi a membership function for conclusion cj, then $A_{ij} > 0$; If there does not exist for phenomenon fi a membership function for conclusion cj, then $A_{ij} = 0$.

The denominator of equation 22, which expresses the clearness of each phenomenon with respect to each conclusion, takes the sum of the static information amounts $Ifi_s$ for only those phenomena fi for which there exists a membership function with respect to conclusion cj.

The clearness results from the normalization of the static information amount via formula (22). Normalizing the value allows the user to more easily grasp the relative discriminability of the information. Accordingly, calculation device 20 determines the clearness of each phenomenon with respect to each conclusion.

The clearness storage device 21 stores the clearness of each phenomenon which has been calculated by calculation device 20 for each conclusion. Clearness need not be calculated each time an inference is made. The clearnesses which have been calculated can be stored in storage device 21 when the expert knowledge is synthesized, and the stored values can be read out each time an inference is to be made. This speeds up inference processing.

The clearness addition device 22 calculates the clearness of phenomena for which data have actually been input with respect to each conclusion. To actually make an inference, the clearnesses of phenomena for which data have been input must be totaled. The total of these clearnesses gives the clearness of the result of the inference. If the clearness is high, then there is a large information amount which can be used to draw an inference. Thus, the clearness can be used as an index with which to judge the reliability of the inference itself.

Clearness with respect to the result of an inference (that is, with respect to each conclusion) is calculated by means of the following formula:

$$Cl_j = \sum_{i=1}^{m} Cl_{ij} \quad (24)$$

In formula (24), the clearness $Cl_{ij}$ of a phenomenon fi for which input data xi have not been received will be 0. In other words, the calculation in formula (24) can only be performed to determine the clearness of a phenomenon for which input data xi are available. The clearness $Cl_j$ of an inference must be in the range of:

$$0.0 \leq Cl_j \leq 1.0.$$

In other words, when data are input for all the phenomena which, according to the knowledge stored prior to the inference, can be used to draw a conclusion, and an inference is made, the clearness of that conclusion will be 1.0. If data are input for only some of the phenomena which can be used to draw a conclusion, the clearness will be a value between 0.0 and 1.0. If, from among the usable phenomena, many phenomena with high clearness are used, then the clearness of the conclusion will be high. In this instance, the inference made will be highly reliable.

The clearness display 23 displays the clearness of an inference result (for example, the above-mentioned possibility) after the clearnesses have been totaled by addition device 22. Clearness can be displayed along with the result of the inference or it can be sent to another device and stored in a memory or file.

The clearness display presents the clearness for every conclusion resulting from the inference. Thus, when there is more than one conclusion, the clearness assigned to each conclusion will be displayed.

With this scheme, the information amount of a phenomenon will be calculated each time data are input for that phenomenon. When the clearness of an inference is displayed, the user will be able to judge the reliability of the inference.

As described above, the static information amount of each phenomenon is calculated by device 19. The resulting values for each conclusion are arranged in the form of a table, as shown in FIG. 6. This table is stored by calculation device 19 or static information amount display device 31. The values in Table 6 are arranged in order of size.

When the number j or the code which specifies a conclusion is input via command display 32, the static information display 31 reads out the static information amounts from the Table shown in FIG. 6. Specifically, display 31 shows the five highest and five lowest values, so the user sees a total of ten static information amounts. If the values displayed have a large variance, the user may want to view the static information amount of each phenomenon. He can do this by inputting, via command display 32, a command to display all phenomena. When this command is input, the display 31 shows the static information amount of every phenomenon related to the given conclusion. As a result, the user can evaluate the static information amount of each phenomenon related to the desired conclusion. In other words, he can view the display and judge whether or not a phenomenon is useful with respect to a conclusion (i.e., whether or not it contributes to the conclusion).

As discussed above, the clearness $Cl_{ij}$ of each phenomenon with respect to each conclusion is obtained by normalizing the static information amount. This being the case, one could alternately choose to store the clearnesses in Table 6 and display them on display 31 instead of the static information amounts.

The phenomenon elimination device 33 is used to input phenomena which, according to the user's judgment, must be eliminated. The user makes this judgment by viewing the static information amount (or clearness $Cl_{ij}$) of each phenomenon which is displayed on display 31.

If, for example, the user compares the phenomena with the five largest information amounts and those with the five smallest information amounts, all of which he sees on display 31, and finds that the variance between them is quite large (say the largest values are more than twice as large as the smallest), he can then input via device 33 the information that the phenomena with low static information amounts should be eliminated.

When one or more phenomena to be eliminated from consideration for a given conclusion are input via device 33, the possibilities and clearnesses are recalculated. That is, data expressing the phenomena to be eliminated are sent to the calculation device 15, which calculates grade. The operations which this device would perform to determine the grade of the eliminated phenomena to the membership function for the conclusion are eliminated. Similarly, the input data for the eliminated phenomena are not included in the calculations performed by device 17 to determine possibility. What is meant, then, by the elimination of phenomena is that these phenomena are removed from the rules expressing the expert knowledge. The possibilities are recalculated according to the new rule, from which the phenomena input by device 33 have been eliminated from consideration for the given conclusion. The new possibilities are then displayed on display 18. With this scheme, the user is able to judge whether or not it was appropriate to remove those phenomena from consideration.

In the same way, the data input by device 33 expressing the phenomena to be eliminated are sent to calculation device 19, which determines static information amount. This content is then recalculated according to the new rules from which the unwanted phenomena have been removed. The clearnesses are also recalculated and re-summed. The new clearness of each conclusion is shown on display device 23, and the new static information amount on display device 31.

The static information amounts are displayed, a command is input specifying which data to remove, and the various calculations are redone in accordance with the new rules from which the unwanted phenomena have been eliminated. This sequence is performed repeatedly by changing the conclusion number j until all of the conclusions have been processed. Finally, all the rules related to conclusions will have assumed a simpler form.

Figure 7:
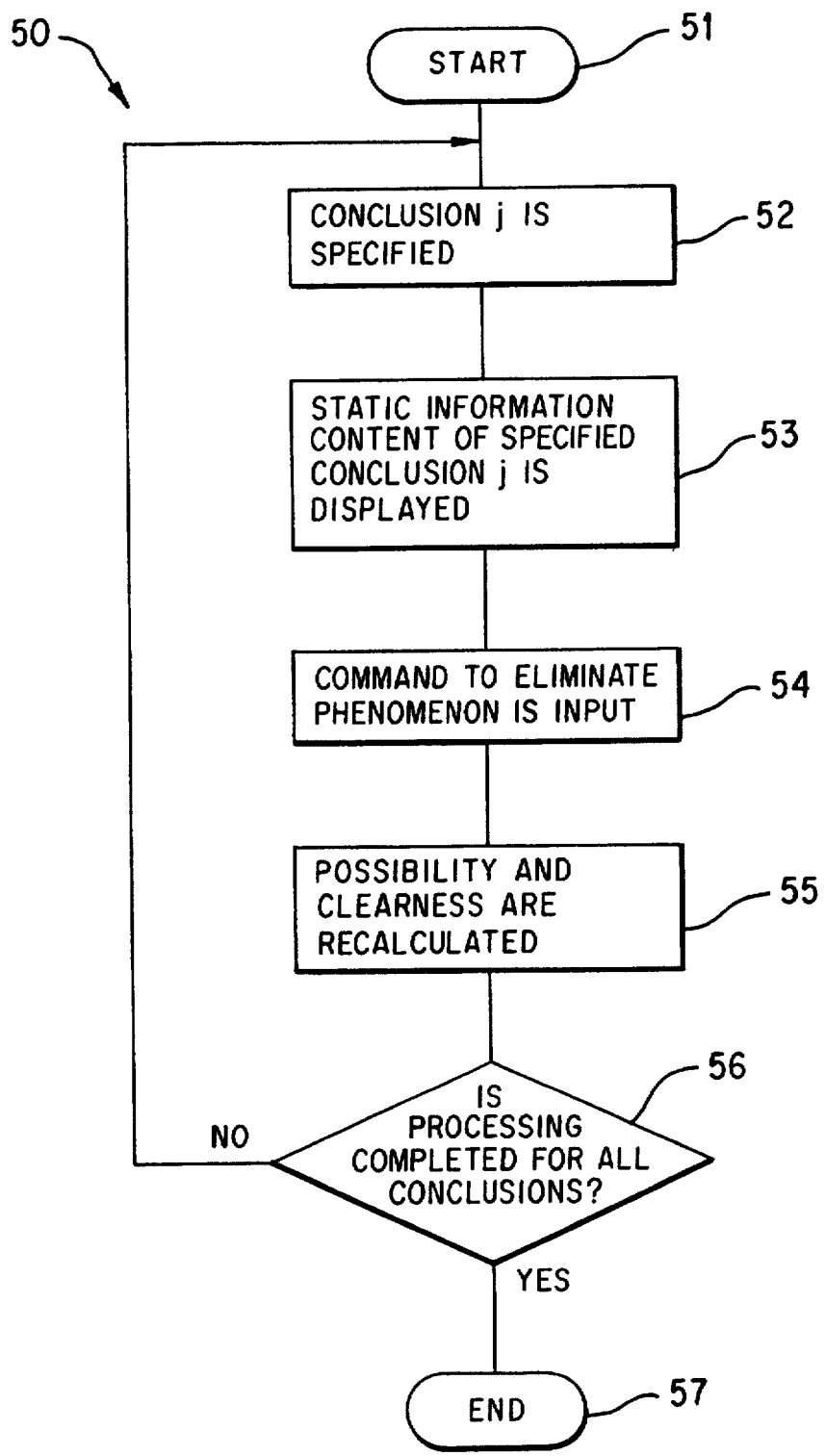
FIG. 7 is a flowchart diagram illustrating the process by which phenomena are eliminated from consideration.

Specifically, as shown in FIG. 7, the elimination process starts at step 51, whereupon the conclusion number j to be processed is identified at step 52. The static information amount for the specified conclusion is then displayed in step 53. The user then inputs a command at step 54 specifying which data are to be eliminated. At step 55, the possibility and clearness are recalculated until all conclusions have been recalculated.

Figure 8:
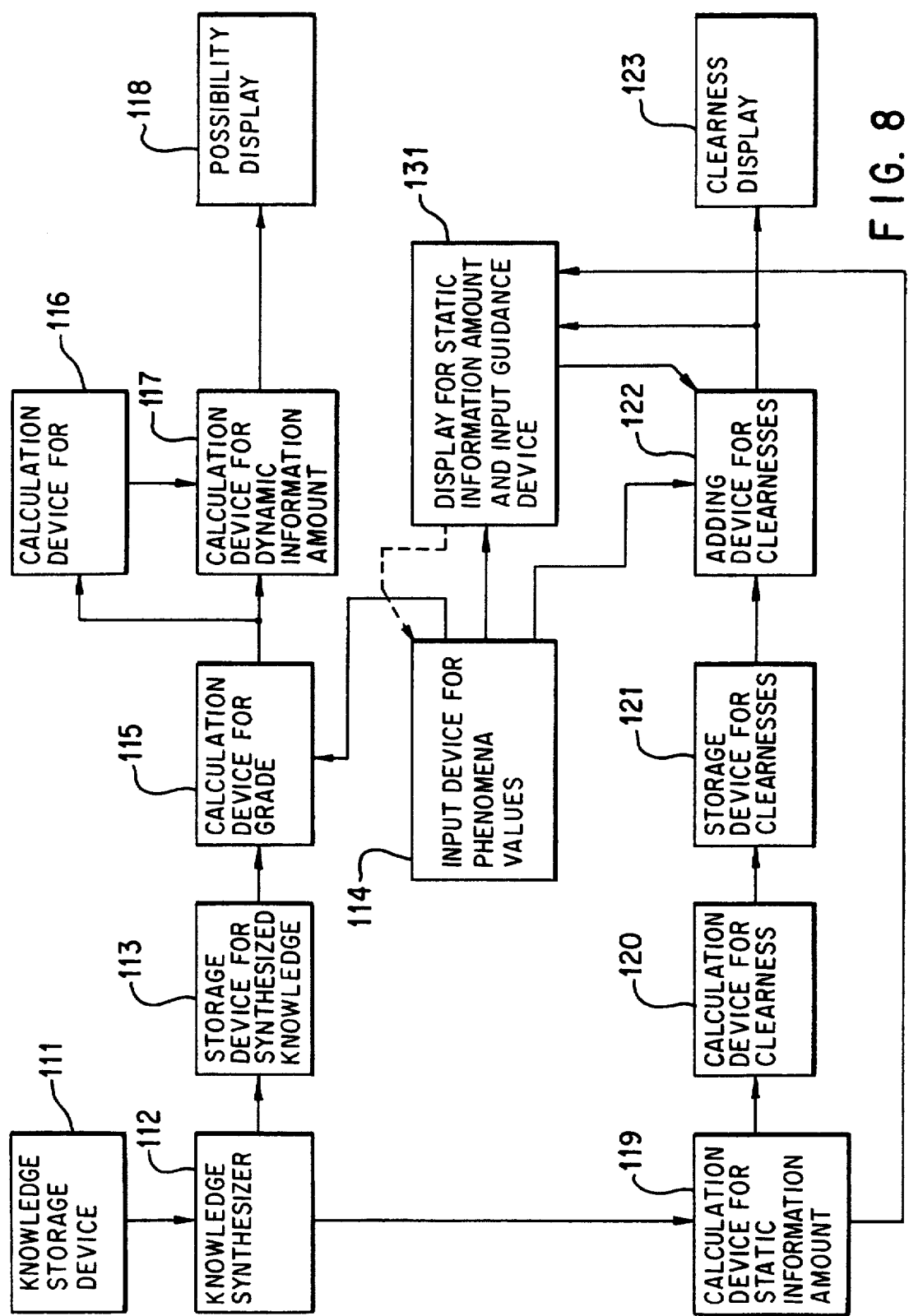
FIG. 8 is a block diagram showing the configuration of an exemplary fuzzy inference device constructed according to a second embodiment of the invention.
Figure 9:
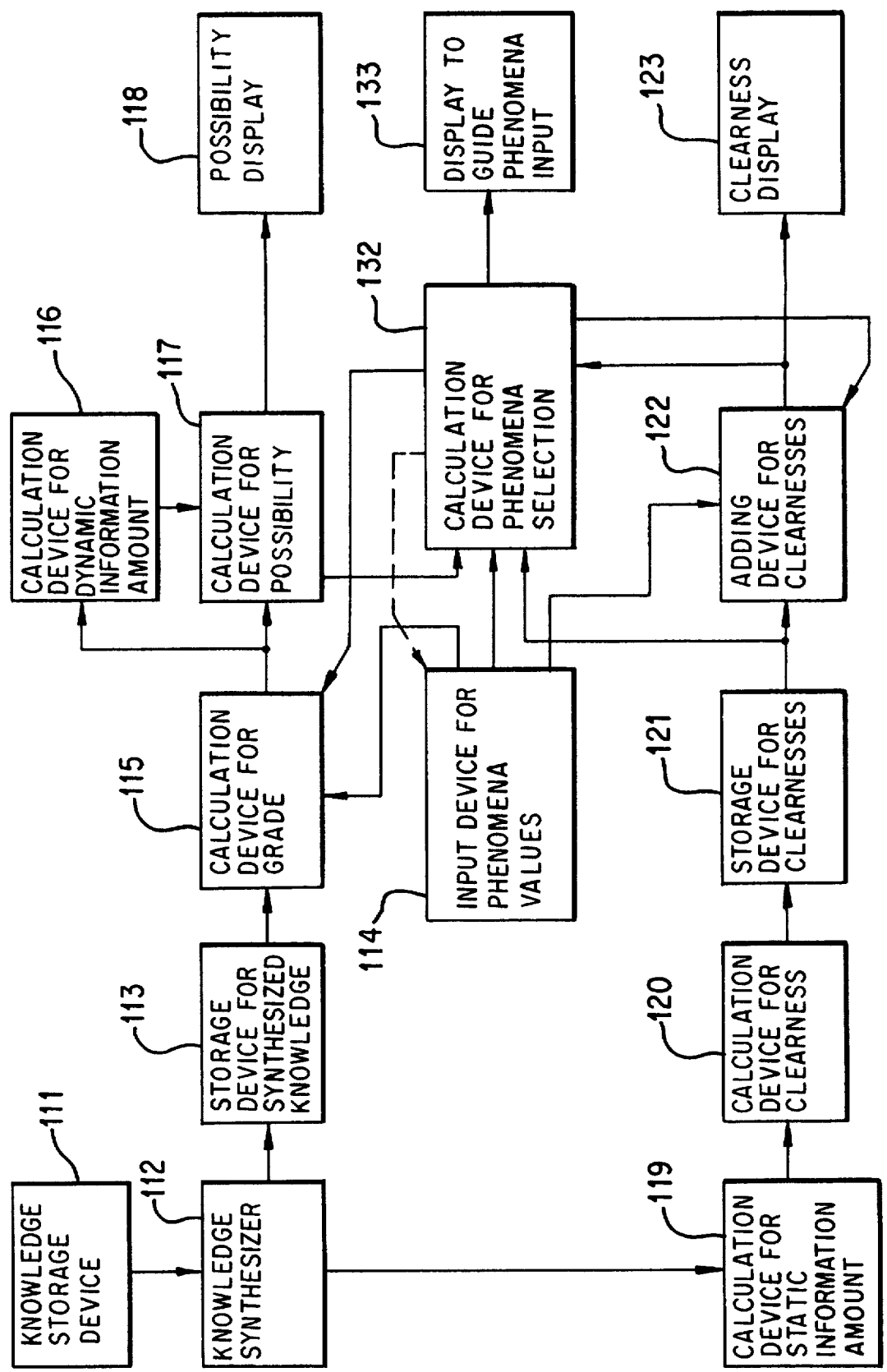
FIG. 9 is a block diagram showing the configuration of the an exemplary fuzzy inference device constructed according to a third embodiment of the invention.

The overall configurations of second and third embodiments of fuzzy inference device are shown respectively in FIGS. 8 and 9. The fuzzy inference devices pictured in FIGS. 8 and 9 have components which are similar to those described with respect to FIG. 1 and are as follows: a knowledge storage device 111; a knowledge synthesizer 112; a storage device 113 for synthesized knowledge; an input device 114 for values of phenomena; a calculation device 115 to determine a grade; a calculation device 116 to determine a dynamic information amount; a calculation device 117 to determine a possibility; a possibility display device 118; a calculation device 119 to determine a static information amount; a calculation device 120 to determine clearnesses; a clearness storage device 121; an adding device 122 to add the clearnesses; and a clearness display device 123. All of these devices, 111 through 123, are found in both Embodiment 2 (FIG. 8) and Embodiment 3 (FIG. 9) and are similar to respective elements 11–23 of FIG. 1. Only the differences between these elements and those of FIG. 1 are described below.

The fuzzy inference device of the second embodiment is also equipped with a display device (131) for the static information amount and the input instructions.

The fuzzy inference device of the third embodiment is also equipped with a calculation device 132, which determines the selection of phenomena; and an input instruction display device 133.

In the following section, those aspects of structure which are common to the second and third embodiments and then the structure and function of each of the embodiments are described separately.

As previously described with reference to the knowledge storage device 11 of FIG. 1, the device 111 stores knowledge input by an expert user using data exemplified previously by Rules 1–6 and by information in Tables 1 and 2.

The knowledge synthesizer 112 of FIG. 8 is also similar to the knowledge synthesizer 12 of FIG. 1 in that it synthesizes the knowledge of two or more experts stored in storage device 111 to give it a coherent form. Details of the operation of the synthesizer 112 are the same as previously described with reference to Formulas 7–14 and FIGS. 2–4C.

Referring to the storage device 113, the features of the storage device are the same as previously described with respect to the storage device 13 of FIG. 1. The means and standard deviations calculated by knowledge synthesizer 112 are stored in storage device 113 in the form shown previously in Table 3.

The calculation device 115 calculates a grade in a manner similar to device 15 of FIG. 1. In addition, the operations of calculation devices 116 and 119 are similar to devices 16, 19 of FIG. 1 (as illustrated in FIGS. 5A–5B and as explained by equations 15–19).

With respect to the possibility calculation device 117, the operation thereof is similar to device 17 of FIG. 1, in that it performs the calculations set forth in equations 20–21. Also, the possibility display device 118 is similar to display device 18 of FIG. 1 as it performs the calculations set forth in equations 20–21. Also the possibility display device 118 is similar to display device 18 of FIG. 1 as it displays the possibility which has been calculated for each conclusion by possibility calculation device 117.

Calculation device 120 calculates the clearness of each phenomenon with respect to each conclusion as described with respect to device 20 of FIG. 1, and with respect to Formulas 22–23.

As with storage device 21 of FIG. 1, storage device 121 stores the clearness of each phenomenon which has been calculated by calculation device 120 for each conclusion and the clearness addition device 122 calculates the clearness of phenomena for which data have actually been input with respect to each conclusion.

The clearness display device 123 displays the clearness of an inference result (for example, the above-mentioned possibility) after the clearnesses have been totaled by addition device 122.

Figures 10, 11:
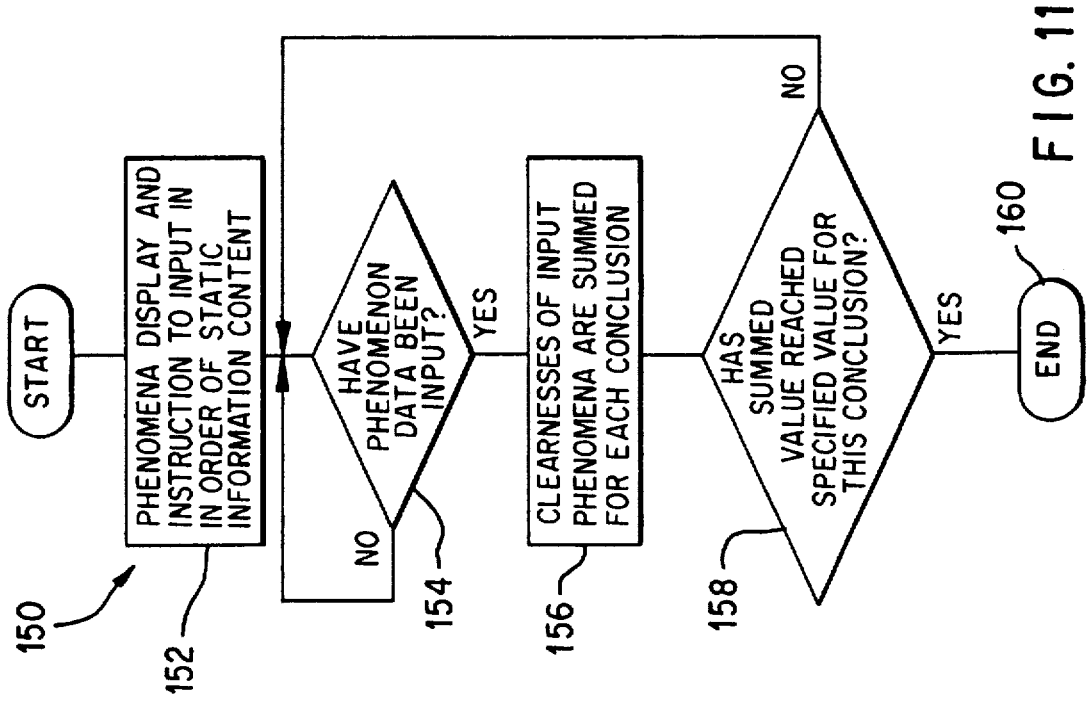
FIG. 10 a table of static information amounts.
FIG. 11 is a flowchart showing the order in which processing is performed by a static information amount display-input guidance device.

As has been described above, the static information amount of each phenomenon is calculated by device 119. The resulting values for each conclusion are arranged in the form of a Table, as shown in FIG. 10. This Table is stored by calculation device 119 or static information amount display-input guidance device 131. The values in Table 7 (FIG. 10) are arranged in order of the size of the static information amounts.

As described above, the static information amount $If_s$ indicates the degree to which the membership function of a phenomenon allows a conclusion to be distinguished. Static information amount display-input instruction device 131 displays the phenomena to be input in the order of their static information amounts. The screen can display the numbers which identify the phenomena corresponding to the static information amounts shown in FIG. 10; or it can display the phenomena for which data should be input each time phenomenon data are to be input. A user views the display and inputs phenomenon data via input device 114 in the order of the static information amounts of the phenomena. Alternately, phenomenon data may be expressed as detection signals emitted by a sensor. In this case, instruction device 131 controls input device 114 in such a way that it picks up the detection signal for each phenomenon from the sensor in the order determined by the ranking of their static information amounts.

The fuzzy inference device of the second embodiment (FIG. 8) displays the static information amounts via device 131 before performing a fuzzy inference. This allows a person to input phenomenon data in the order indicated by the ranking of their static information amounts. Alternately, input device 114 can be controlled in such a way that it inputs the phenomenon data. In this way, the fuzzy inference device insures that those data required for an inference will be entered. Once these data have been input, calculation device 115, which determines a grade, and calculation device 117, which determines a possibility, are activated, and a fuzzy inference is performed.

FIG. 11 is a flowchart 150 showing the order in which the processing, done by static information amount display-input guidance device 131, is performed.

In the first step 152, the static information amounts of all the phenomena, which have been calculated by calculation device 119, are displayed in order of descending size. As an alternate first step, the input device 114 receives the direction to input data. The user is directed to input the phenomenon data, or the device is controlled so that it inputs the data at Step 152. When the phenomenon data have been input at step 154, the clearnesses of the phenomena for which data have been input are added for every conclusion by adding device 122 at step 156. When the value of the summed clearnesses for a specified conclusion reaches a specified value (a value which allows the user to trust the conclusion, generally a value which approximates 1), at step 158, the processing ends at step 160. The device can also perform steps 154 and 156 repeatedly until the summed clearnesses reach a specified value for each of a number of specified conclusions.

A user can also discontinue the inputting of phenomenon data when he feels that it is possible to evaluate a conclusion even though the summed clearnesses have not yet reached the specified value.

In the second embodiment, the ranking of the static information amounts is used as a standard by which the phenomenon data can be input. It is, of course, also possible to use the ranking of the clearnesses which have been calculated from the static information amounts for each phenomenon with respect to each conclusion. In this case, the processing ends when the summed clearnesses reach a specified value for each conclusion.

As has been described above, the second embodiment of the invention arranges the static information amounts of all the phenomena in order of size and outputs them. This allows the phenomenon data for all the phenomena to be input in the order determined by the ranking of their static information amounts. The static information amount of a phenomenon indicates the degree to which the membership function of a phenomenon allows a conclusion to be distinguished. The phenomenon data are entered in order starting with those having the largest static information amounts. This enables the user to achieve a conclusion with high clearness after entering a relatively small number of data. A fuzzy inference can then be performed more efficiently, and less processing time is required. An inexperienced user who cannot judge or who finds it difficult to judge which phenomenon data to enter first is told in what order to enter the data. Thus, even a beginning user can achieve a conclusion efficiently without any confusion.

The third embodiment of the invention is shown in FIG. 9 wherein like elements to those in FIG. 8 have the same reference numbers. In FIG. 9 a calculation device for phenomena selection 132 and a display device to guidance phenomena input 133 replace the display device 131 in FIG. 8. The third embodiment performs the calculations entailed by a fuzzy inference, including calculating the possibility of a conclusion and summing the clearnesses of phenomena, based on the data input for each phenomenon by input device 114. If these phenomenon data do not yield a conclusion with sufficiently high clearness, supplementary phenomenon data can be input by this device. This might be necessary, for example, when the user feels that too few phenomenon data have been input to evaluate the conclusion (when a conclusion with a high possibility has a low clearness); or when it is impossible to evaluate the final conclusion adequately because, although individually the values of their clearnesses are fairly high, the possibility values of a number of conclusions are virtually identical.

In general, if insufficient phenomenon data have been input, or if data for a particularly significant phenomenon have not been input, the possibility and clearness will both be low. Calculation device 132 for phenomenon selection will refer to data stored in storage device 121 concerning the clearness of each phenomenon with respect to each conclusion. It will then select those phenomena (for which data have not yet been input) which will raise the clearness of each conclusion to its maximum possible value. The phenomena which have been selected are sent to input guidance display device 133, which directs the user to input data for these phenomena. The user views the display and inputs data, via input device 114, for the phenomena which appear on the display device. Alternately, the phenomena selected by calculation device 132 can be sent directly to input device 114. In response, input device 114 accepts the detection signals from sensors or the like for each phenomenon. It is desirable that the processing described above be performed starting with the conclusions which have the highest possibilities.

FIGS. 12 through 14 show the results of fuzzy inferences whose calculations were based on the phenomenon data received. FIG. 12 gives the value of the clearness $Cl_{ij}$ of each phenomenon with respect to each conclusion stored in storage device 121. FIG. 13 is a table of the input completed flags for phenomenon data. An input completed flag is provided for each phenomenon with respect to each conclusion. The input completed flag for a phenomenon concerning which data have been input by input device 114 will be set to 1. Phenomena whose flags are set to 0 are those for which data have not yet been input. The table of FIG. 13 of input completed flags is created by input device 114. FIG. 14 gives the possibility and summed clearness $Cl_j$ of each conclusion. In this table, the possibilities are arranged in order of size. The possibilities of the conclusions are obtained from calculation device 117, and the clearnesses $Cl_j$ from adding device 122.

The various types of data shown in FIGS. 12 through 14 are sent to phenomenon selection calculation device 132 when a fuzzy inference has been completed. This calculation device uses these data to execute the processing 200 shown in FIG. 15.

Figure 15:
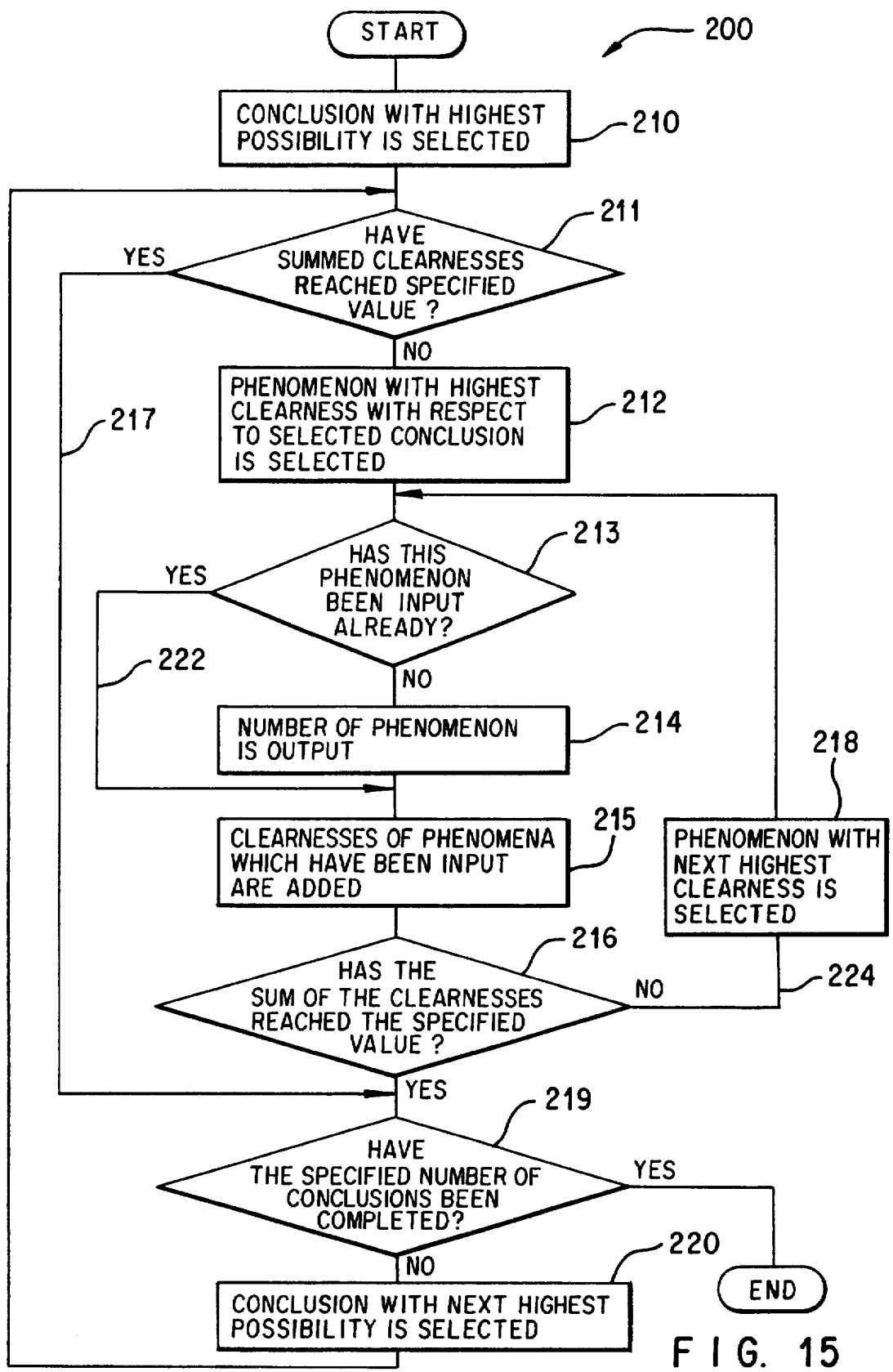
FIG. 15 is a flowchart showing the order in which processing is performed by the calculation device for phenomena selection.

Referring specifically to FIG. 15, first, the conclusion with the highest possibility is selected from the data in FIG. 14 at step 210. The summed clearness $Cl_j$ of this conclusion is compared to a specified value (a value large enough to evaluate or decide on the conclusion) to determine if the clearness is equal to or greater than this value at step 211. If the summed clearness $Cl_j$ is indeed at least as large as this value, the process branches at 217 and the conclusion with the next highest possibility is selected at step 220.

However, if the summed clearness $Cl_j$ of the selected conclusion is below the specified value, the phenomenon with the highest clearness $Cl_j$ is selected at step 212 from the phenomena associated with that conclusion, using the data in FIG. 12. The table of input completed flags shown in FIG. 13 is then consulted at step 213 to determine whether or not the phenomenon data for the selected phenomenon have been input. If these data have not been input, then at step 214 the number of this phenomenon fi is output to input guidance display device 133 or input device 114.

When it receives this phenomenon number, input guidance display device 133 indicates that phenomenon data should be input for the phenomenon labeled with this number. A user views this display and inputs the data that have been requested via input device 114. Alternately, when input device 114 receives the phenomenon number, it reads the phenomenon data supplied by the sensor associated with the phenomenon labeled with this number. It is desirable that the device be designed in such a way that it will not require that phenomenon data be entered if no data are available for a phenomenon or if the available data are unclear.

When the phenomenon data are input, the process branches to step 215 where the adding device 122 adds the clearness of this phenomenon with respect to this conclusion to the previously summed clearnesses and updates the summed clearness $Cl_j$. The process then checks to determine whether this updated clearness value is equal to or greater than the specified value at step 216. The specified value in step 216 can be the same specified value as was used in step 211, or it can be a different value.

If the value of the summed clearnesses has not reached the specified value at branch 224, then the data in FIG. 12 are consulted, and the phenomenon with the next highest clearness $Cl_j$ with respect to the same conclusion, is selected at step 218. The process then returns to step 212, and the processing in steps 212 through 216 is repeated.

If the value of the summed clearnesses $Cl_j$ has reached the specified value, the processing is completed for that conclusion.

The processing in steps 211 through 218 and Step 220 is repeated for a specified number of conclusions starting with the conclusion having the highest possibility at step 217.

A person can discontinue the processing for a given conclusion when he feels that it is possible to evaluate the conclusion even though the summed clearnesses have not yet reached the specified value.

Input guidance display device 133 is not limited to displaying the phenomena selected on a screen. They can also be printed and output by a printer or communicated to a memory or file for storage.

When the processing has been completed for the specified number of conclusions, calculation devices 115, 116 and 117 recalculates grade, dynamic information amount and possibility. A new fuzzy inference is performed using the phenomenon data to which new phenomenon data have just been added. The updated values obtained (the possibilities of the conclusions, the summed clearnesses, etc.) are shown on display devices 118 and 123.

As has been described above, the third embodiment does not require that all possible phenomenon data be input for the first (initial) fuzzy inference. Rather, the initial inference is based on a tentative set of input data. The data obtained through this initial fuzzy inference are used to select those phenomena which will raise the summed clearnesses to their maximum possible value. These selected phenomenon data are then input. This scheme insures that the summed clearnesses can quickly attain a value sufficient to evaluate the related conclusion without requiring the comprehensive input of phenomenon data. Thus, a conclusion can be produced swiftly and efficiently.

The third embodiment is particularly effective when a limited number of phenomenon data have been input and the user feels that it would be difficult or dangerous to evaluate the conclusion; when there are a number of conclusions with high possibilities or when the user feels that phenomenon data he considers important have not yet been input. In these instances it enables those phenomenon data to be input which can function most effectively. It makes it possible for the non-expert user to arrive at a conclusion efficiently. It is especially helpful to the novice, as it guides him step by step to the phenomena for which data should be input. Consequently, even an unskilled user can input data with great efficiency.

Each of the aforesaid devices 11 through 23 and 31 through 133 can be realized by means of a computer with a memory and a display. Specifically, knowledge synthesizer 12 and calculation devices 115, 116, 117, 119, 120 and 122 would be ideally realized by a CPU operating in accordance with a program operating as described herein.

Although only preferred embodiments are specifically illustrated and described herein, it will be appreciated that many modifications and variations of the present invention are possible in light of the above teachings without departing from the spirit and scope of the invention. Accordingly, the invention is not limited by the foregoing description.

What is claimed is:

1. A fuzzy inference apparatus comprising:

a storage device for storing, prior to the use of said apparatus, rules defining relationships between phenomenon and a plurality of conclusions;

a device for supplying input data;

a fuzzy inference device coupled to said storage device which performs fuzzy inferences to calculate, as an output, the possibility of a conclusion by applying at least one of said stored rules to said input data;

a calculating device coupled to said storage device for calculating at least one of a static information amount and a clearness for each said phenomenon with respect to each respective conclusion using at least one of said stored rules, said static information amount indicating the degree to which a membership function for a phenomenon has a discriminable conclusion, said clearness indicating the relative discrimination ability of each phenomenon at the time a possibility of a conclusion is assessed; and a display device for displaying at least one of said static information amount and said clearness for a particular conclusion;

wherein said fuzzy inference device includes:

a grade calculating device which optimizes a grade using a membership function which expresses said input data in terms of said rules;

a dynamic information calculating device for determining a dynamic information amount of each said phenomenon using said grade, said dynamic information amount indicating the discriminating power a phenomenon possess with regard to deciding on a single conclusion when an inference is made; and a possibility calculating device which determines the possibility of a conclusion using at least one grade and said dynamic information amount.

2. The fuzzy inference apparatus of claim 1, further comprising a display device for displaying said possibility of a conclusion.

3. A fuzzy inference apparatus comprising:

a storage device for storing, prior to the use of said apparatus, rules defining relationships between phenomenon and a plurality of conclusions;

a device for supplying input data;

a fuzzy inference device coupled to said storage device which performs fuzzy inferences to calculate, as an output, the possibility of a conclusion by applying at least one of said stored rules to said input data;

a calculating device coupled to said storage device for calculating at least one of a static information amount and a clearness for each said phenomenon with respect to each respective conclusion using at least one of said stored rules, said static information amount indicating the degree to which a membership function for a phenomenon has a discriminable conclusion, said clearness indicating the relative discrimination ability of each phenomenon at the time a possibility of a conclusion is assessed;

a display device for displaying at least one of said static information amount and said clearness for a particular conclusion;

a summing device for summing a clearness of each said phenomenon with respect to each said conclusion using said status information amount; and an adding device for adding together said summed clearness to said clearness obtained by said calculating means in order to determine clearness of phenomenon for which data have actually been input for each conclusion.

4. The fuzzy inference apparatus of claim 3, further comprising:

a display device for displaying clearness of different inference results obtained from said summing device and adding device.

5. A fuzzy inference apparatus comprising:

a storage device for storing, prior to the use of said inference apparatus, rules defining relationships between phenomenon and a plurality of conclusions;

a calculating device coupled to said storage device for calculating a static information amount of said phenomenon using said stored rules, said static information amount indicating the degree to which a membership function for a phenomenon has a discriminable conclusion;

an output device for outputting said static information amount in relation to each said rule in descending order; and an input device for inputting said phenomena in an order determined by a ranking of said static information amounts of all said phenomena calculated by said calculating means.

6. The fuzzy inference apparatus of claim 5, further comprising:

a clearness calculating device coupled to said storage device for determining a clearness of each phenomenon with respect to each respective conclusion using said static information amounts, said clearness indicating the relative discrimination ability of each phenomenon at the time a possibility of a conclusion is assessed; and a summing device for summing said clearness to determine the clearness of phenomenon for which data have actually been input and the clearness of each said conclusion.

7. The fuzzy inference apparatus of claim 6, further comprising:

a device for supplying input data;

a fuzzy inference device for performing fuzzy inferences by calculating possibilities of conclusions by applying said input data for each said phenomenon to said rules.

8. The fuzzy inference apparatus of claim 7, wherein said fuzzy inference device includes:

a grade calculating device for optimizing a grade using membership functions which express said input data in terms of said rules;

a dynamic amount calculating device for determining said dynamic information amount of each of said phenomenon using said grade, said dynamic information amount indicating the discriminating power a phenomenon possess with regard to deciding on a single conclusion when an inference is made; and a device for calculating the possibility of a conclusion using at least one of said grades and said dynamic information amounts.

9. The fuzzy inference apparatus of claim 5, further comprising:

a device for supplying input data;

a fuzzy inference device for performing fuzzy inferences by calculating possibilities of conclusions by applying said input data for each said phenomenon to said rules.

10. A fuzzy inference apparatus comprising:

a storage device for storing, prior to the use of said inference apparatus, rules defining relationships between phenomenon and a plurality of conclusions;

a calculating device coupled to said storage device for calculating a static information amount of said phenomenon using said stored rules, said static information amount indicating the degree to which a membership function for a phenomenon has a discriminable conclusion;

an output device for outputting said static information amount in relation to each said rule in descending order;

a clearness calculating device coupled to said storage device for determining a clearness of each phenomenon with respect to each respective conclusion using said static information amounts; and a summing device for summing said clearness to determine the clearness of phenomena for which data have actually been input and the clearness of each said conclusion.

11. The fuzzy inference apparatus of claim 10, further comprising:

means for controlling processing such that said phenomena are input and said clearnesses calculated repeatedly until said clearnesses summed by said summing means reach a specified value for at least one said conclusion.

12. The fuzzy inference apparatus of claim 11, further comprising:

a device for supplying input data;

a fuzzy inference device for performing fuzzy inferences by calculating possibilities of conclusions by applying said input data for each said phenomenon to said rules.

13. The fuzzy inference apparatus of claim 10, further comprising:

a device for supplying input data;

a fuzzy inference device for performing fuzzy inferences by calculating possibilities of conclusions by applying said input data for each said phenomenon to said rules.

14. A fuzzy inference apparatus, comprising:

a storage device for storing, prior to the use of said fuzzy inference device, rules defining relationships between phenomenon and a plurality of conclusions;

a calculating device coupled to said storage device for calculating a static information amount of each phenomenon using one of said rules, said static information amount indicating the degree to which a membership function for a phenomenon has a discriminable conclusion;

clearness means for determining a clearness of each phenomenon with respect to each conclusion using said static information amount, said clearness indicating the relative discrimination ability of each phenomenon at the time a possibility of a conclusion is assessed; and a display device for displaying clearness of said phenomenon for each said conclusion in descending order of value.

15. The fuzzy inference apparatus of claim 14, further comprising:

a summing device for summing together said clearnesses of all said phenomena for which actual data have been input in order to calculate a clearness for each respective conclusion.

16. The fuzzy inference apparatus of claim 15, further comprising:

means for controlling processing such that said phenomena are input and said clearnesses are calculated repeatedly until the value of said clearnesses summed by said summing device reaches a specified value for at least one conclusion.

17. The fuzzy inference apparatus of claim 16, further comprising:

a device for supplying input data;

a fuzzy inference device for performing fuzzy inferences by calculating possibilities of conclusions by applying said input data for each said phenomenon to said at least one respective rule.

18. The fuzzy inference apparatus of claim 17, whereby said fuzzy inference device further comprises:

a grade calculating device for optimizing grades using membership functions which express said input data in terms of said at least one rule;

a dynamic information device for calculating a dynamic information amount of each said phenomenon using said grade, said dynamic information amount indicating the discriminating power a phenomenon possess with regard to deciding on a single conclusion when an inference is made; and a possibility calculating device for calculating a possibility of said conclusion using said grade and said dynamic information amount.

19. A fuzzy inference apparatus, comprising:

a storage device for storing, prior to the use of said fuzzy inference device, rules defining relationships between phenomena and a plurality of conclusions;

a device for supplying input data;

a fuzzy inference device for performing fuzzy inferences which calculates a possibility for a conclusion by applying said input data for each phenomenon to at least one said rule;

a device coupled to said storage device for calculating a clearness for each said phenomenon with respect to each respective conclusion using said at least one rule;

a summing device for summing a plurality of clearnesses of said phenomena for which data have actually been input in order to calculate said clearness of each said conclusion; and a device for selecting those phenomena which cause said sum of clearnesses to attain its maximum possible value with respect to a given conclusion.

20. The fuzzy inference apparatus of claim 19, wherein said fuzzy inference device outputs a conclusion which is a conclusion which has a highest possibility value.

21. The fuzzy inference apparatus of claim 19, wherein said fuzzy inference device comprises:

a device for calculating a grade by optimizing said grade using membership functions which express input data in terms of said rules;

a device for calculating a dynamic information amount by determining a dynamic information amount of each said phenomenon using said grade; and a device for calculating a possibility, which determines the possibility of a conclusion using said grade and dynamic information amount.

22. The fuzzy inference apparatus of claim 19, further comprising:

a display device for displaying commands for assisting a user in directing which phenomena data should be input for said phenomena selected by said selecting device.

23. The fuzzy inference apparatus of claim 22, further comprising:

means for controlling said fuzzy inference device such that it recalculates a possibility of said conclusion by applying all said input data, including said phenomena input according to the selection made by said selecting device.

24. The fuzzy inference apparatus of claim 19, further comprising:

an input device for entering data for said phenomena selected by said means for selecting.

25. The fuzzy inference apparatus of claim 24, further comprising:

means for controlling processing such that said data are input and said clearnesses are calculated repeatedly until the value of said clearnesses summed by said summing device reaches a specified value for said specified conclusion.

26. The fuzzy inference apparatus of claim 25, further comprising:

means for controlling said fuzzy inference device such that it recalculates a possibility of said conclusion by applying all said input data, including said phenomena input according to the selection made by said selecting device.

27. The fuzzy inference apparatus of claim 24, further comprising:

means for controlling said fuzzy inference device such that it recalculates a possibility of said conclusion by applying all said input data, including said phenomena input according to the selection made by said selecting device.

28. The fuzzy inference apparatus of claim 19, further comprising:

means for controlling processing such that said phenomena which correspond to said plurality of conclusions are repeatedly selected by said selecting device.

29. The fuzzy inference apparatus of claim 28, further comprising:

means for controlling said fuzzy inference device such that it recalculates a possibility of said conclusion by applying all said input data, including said phenomena input according to the selection made by said selecting device.

* * * * *